May 7, 1929.  G. S. HILTZ ET AL  1,711,497
CURRENT TRANSMISSION APPARATUS FOR PRINTING
TELEGRAPH AND OTHER SYSTEMS
Filed May 22, 1926   10 Sheets-Sheet 9

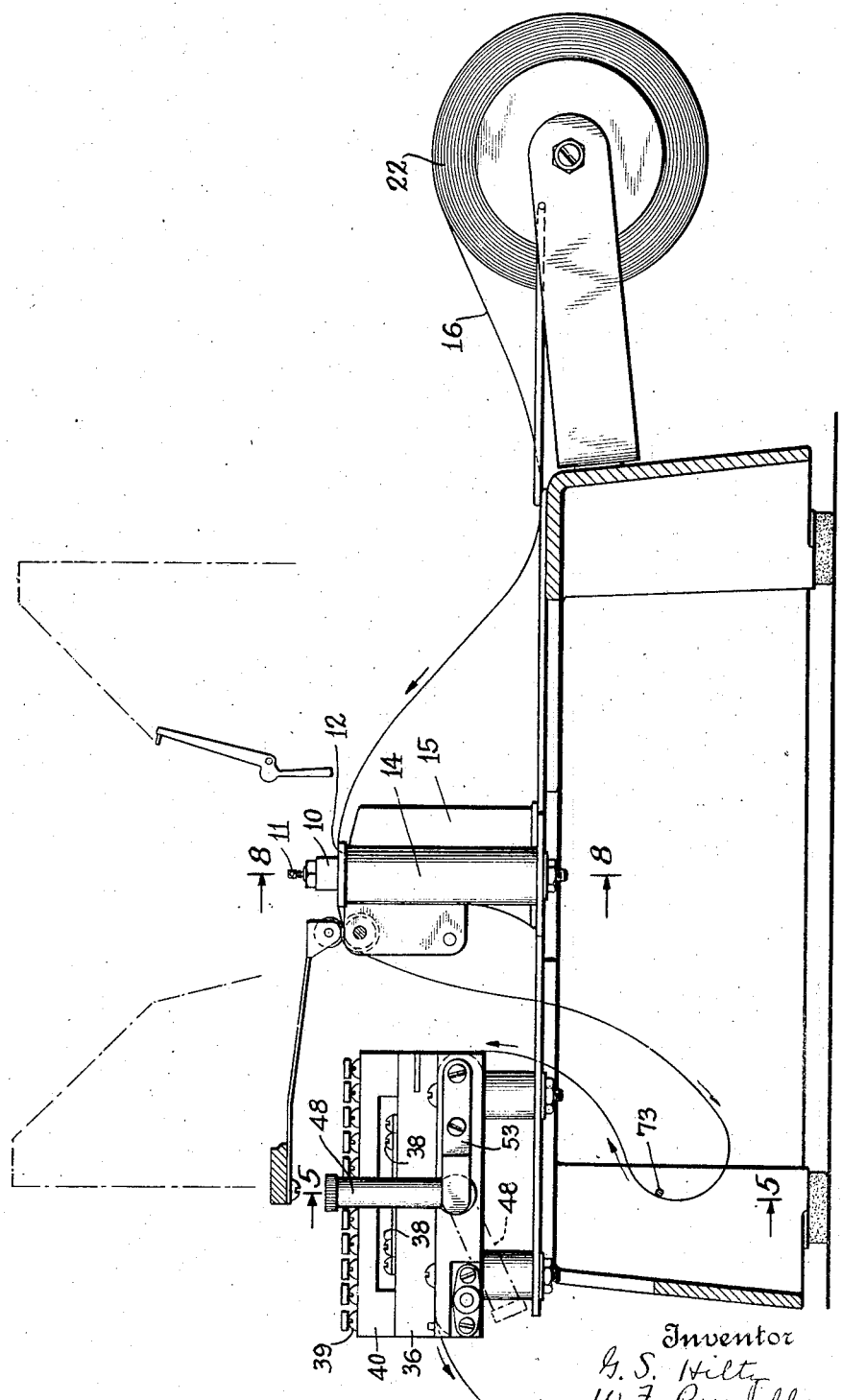

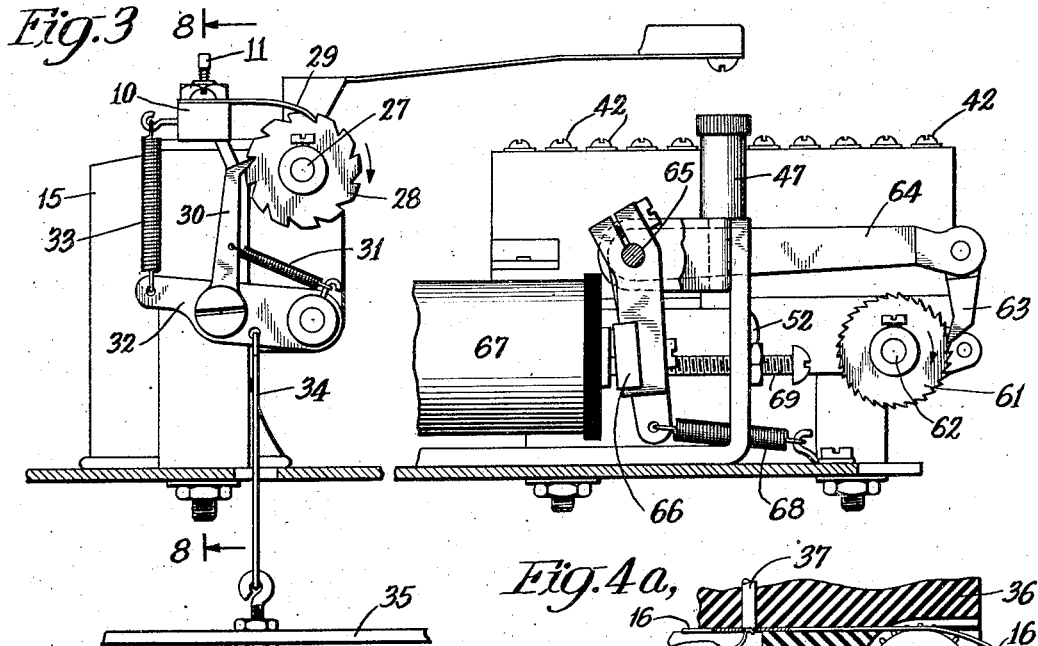
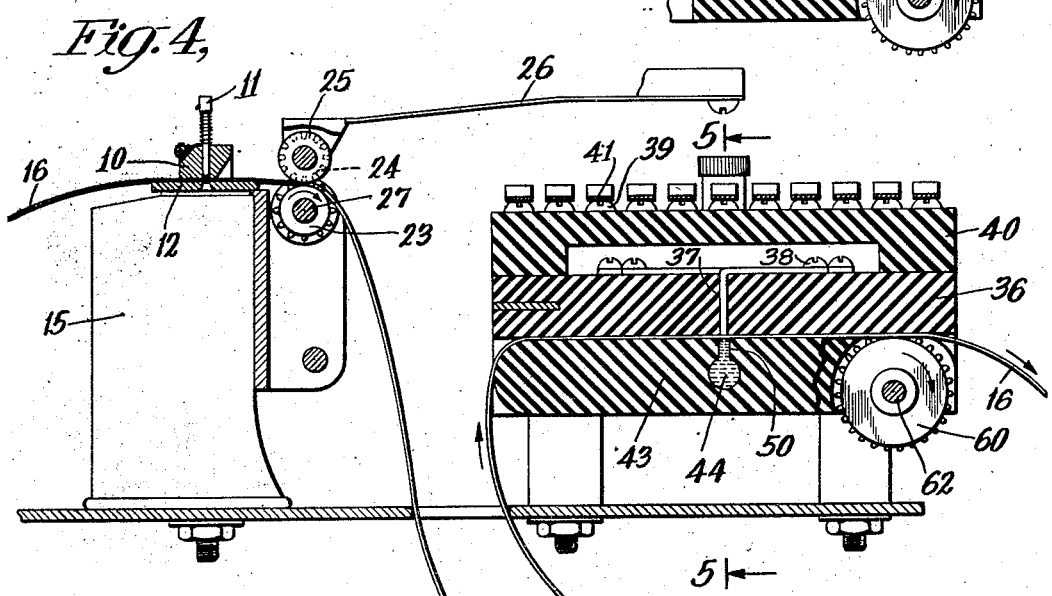

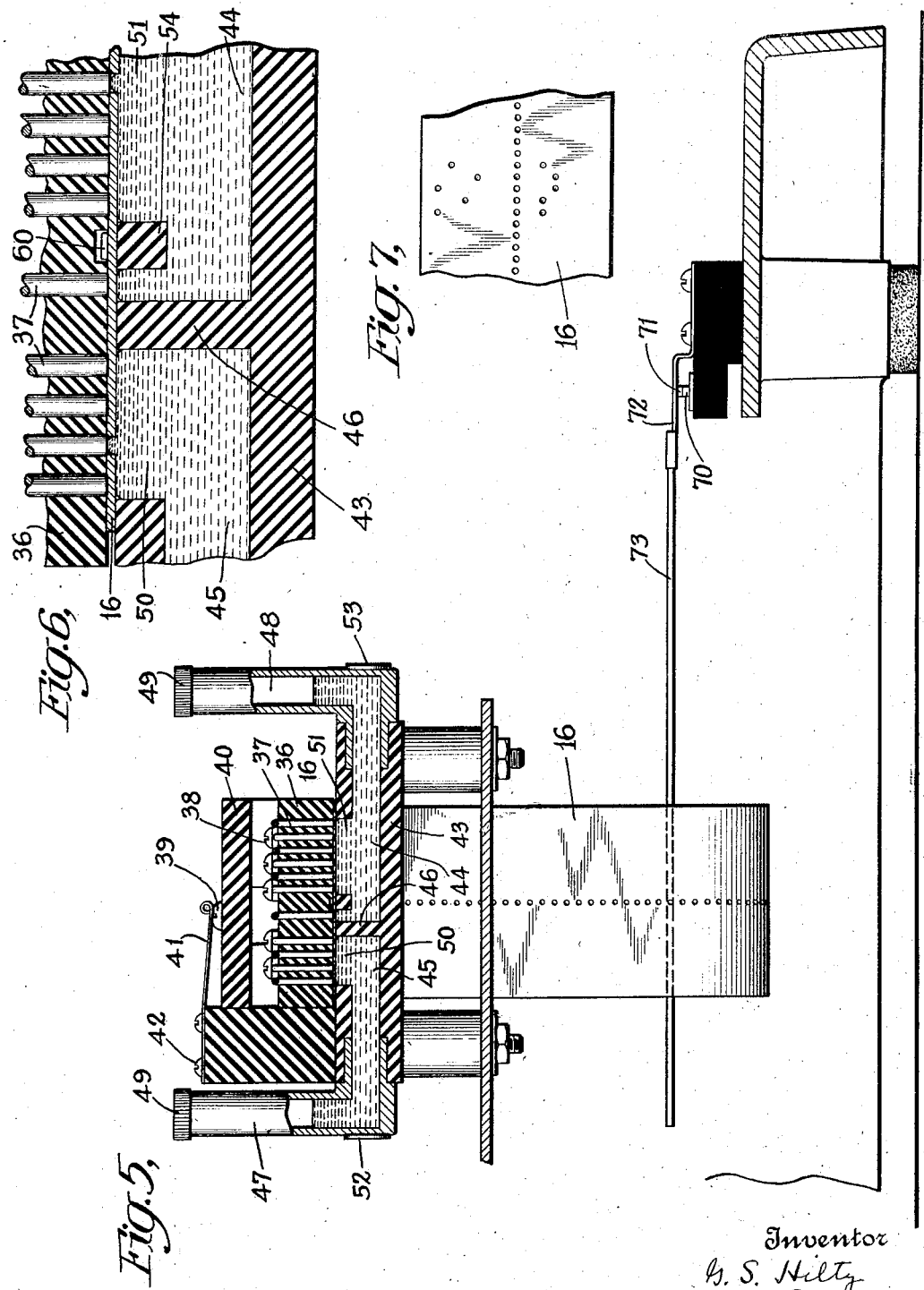

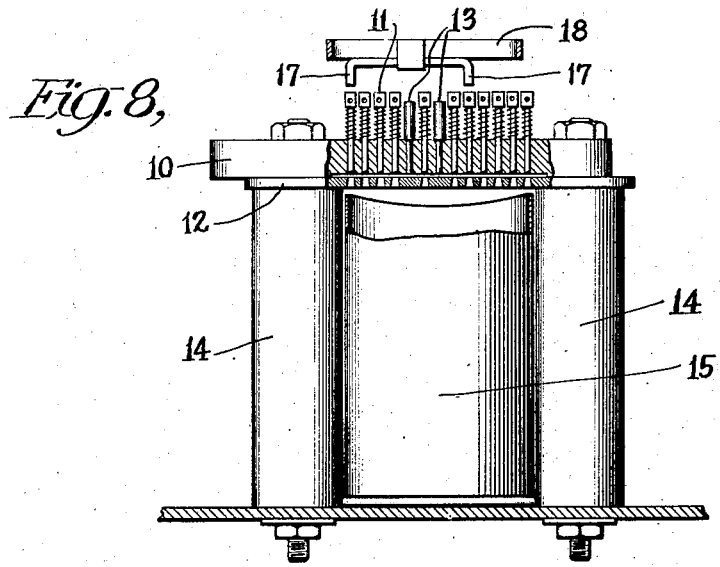
Fig. 8,
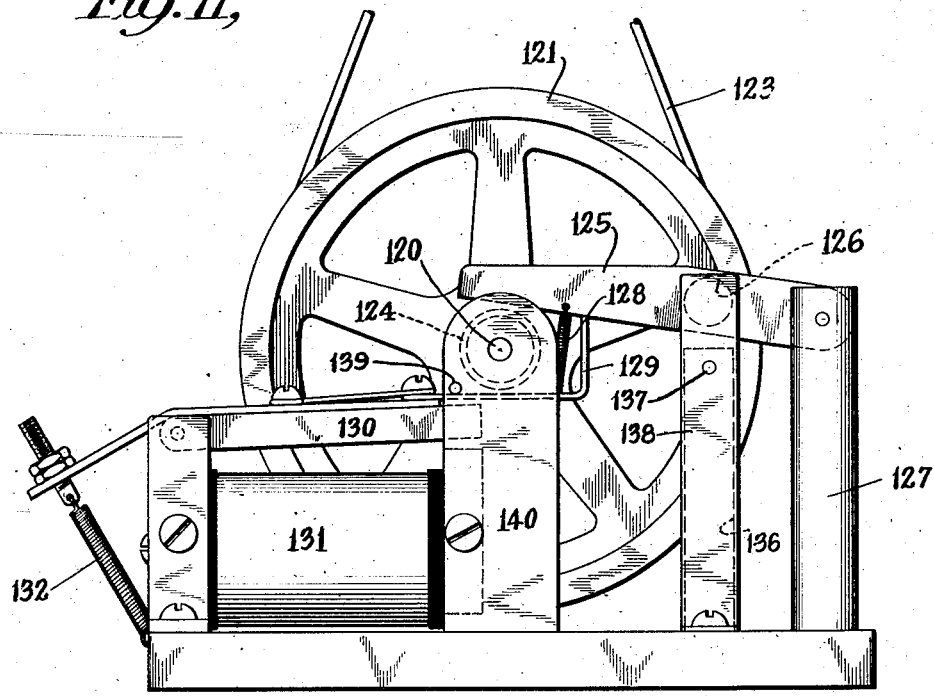
Fig. 11,

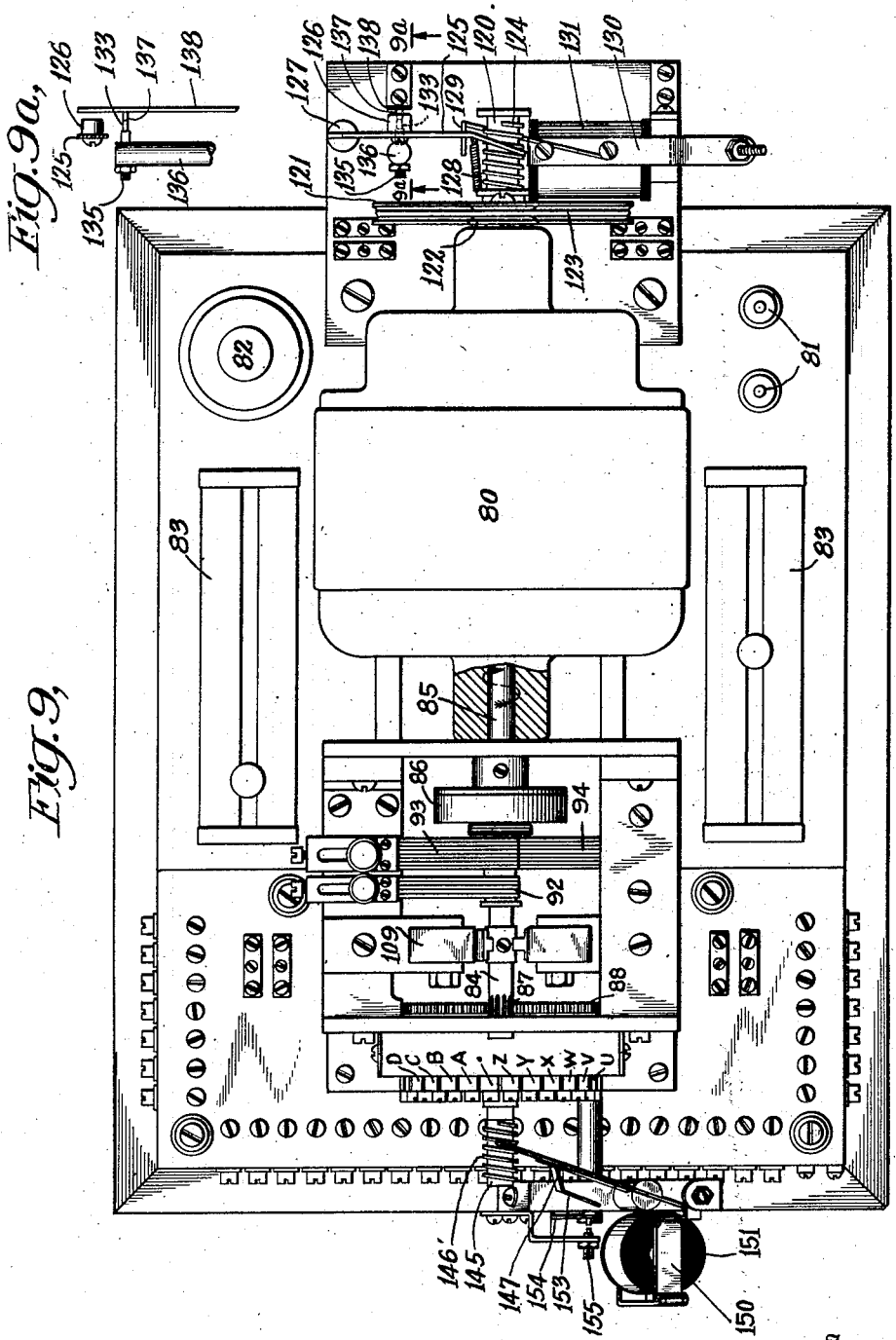

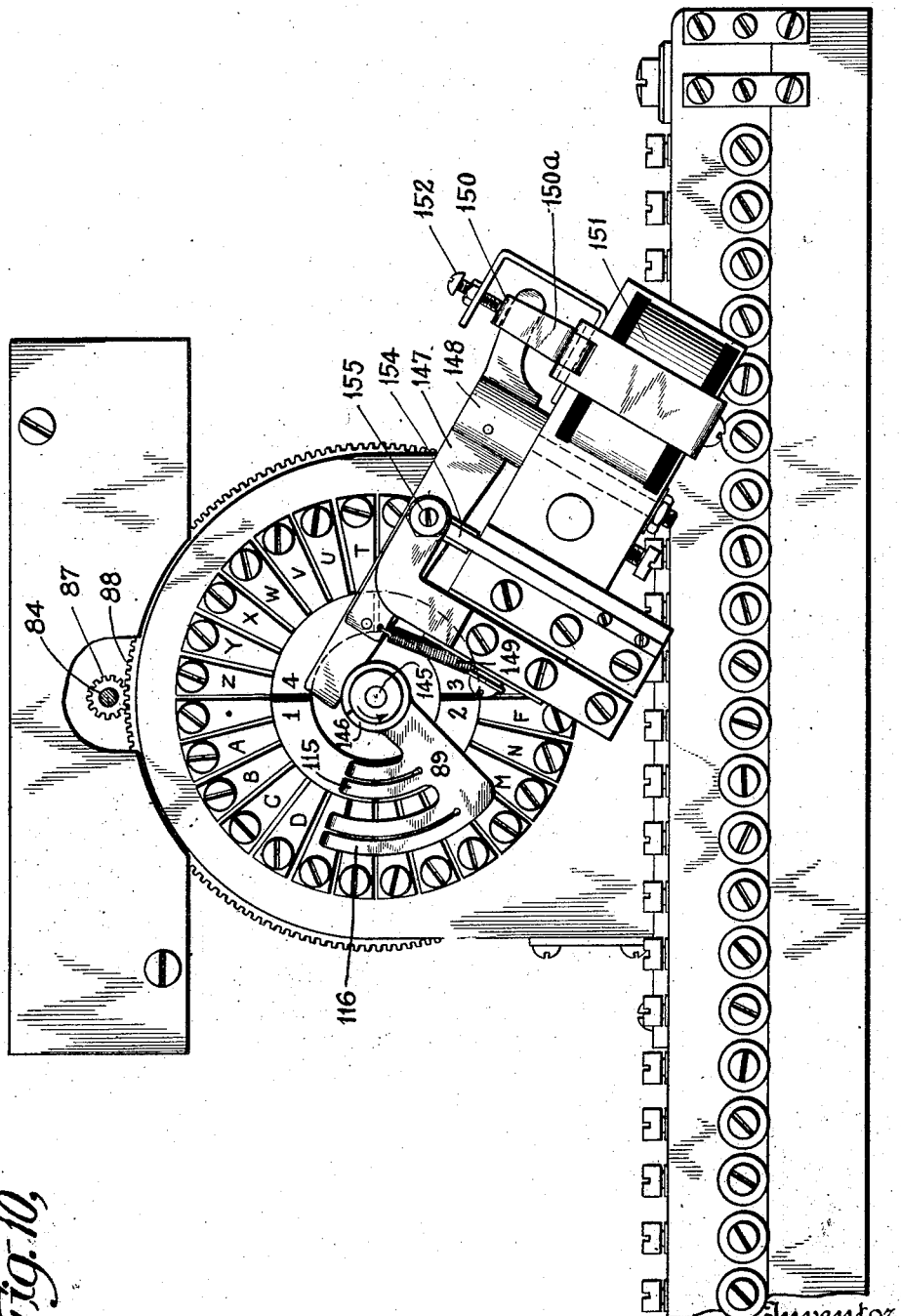

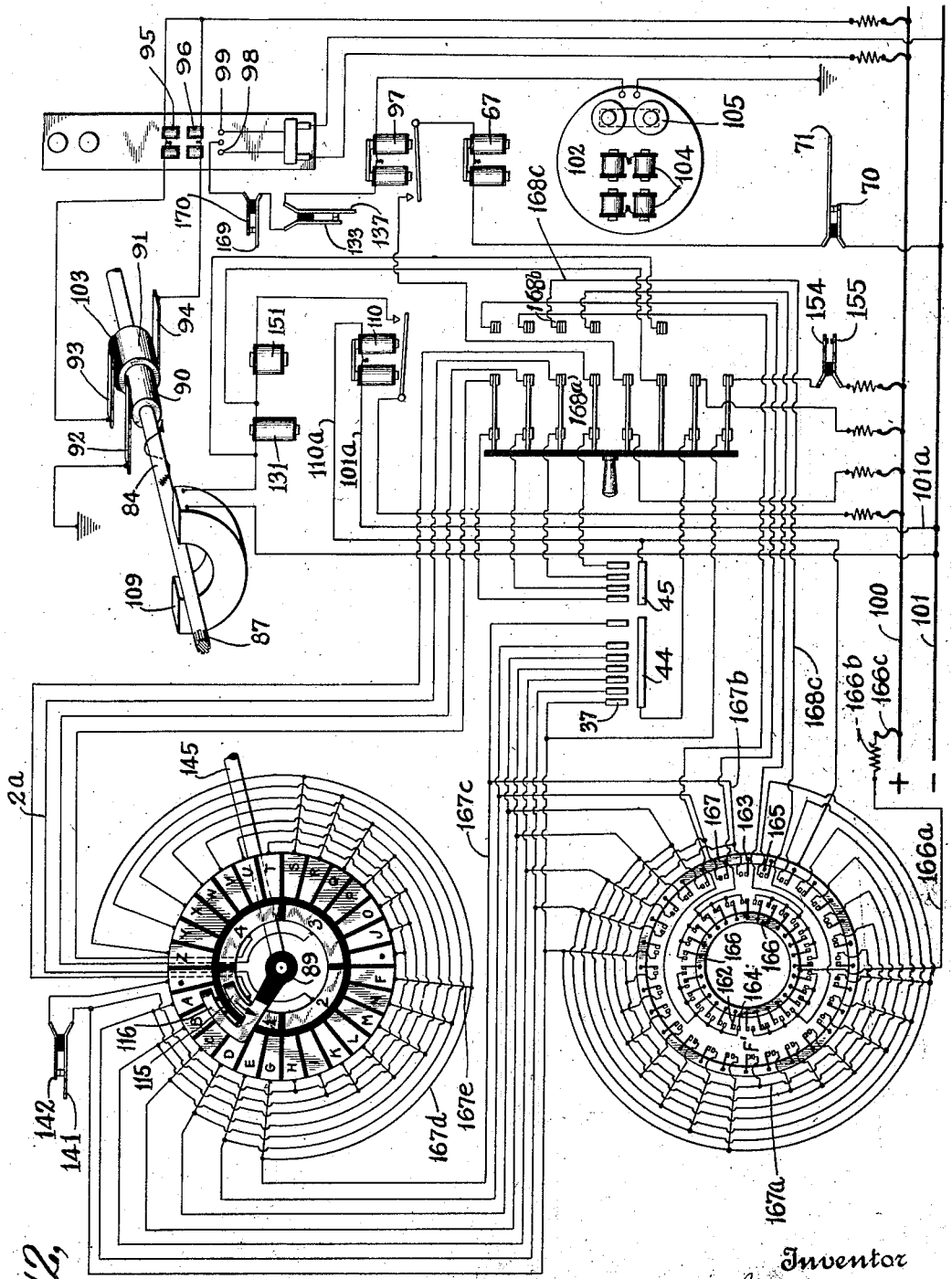

Inventor
G. S. Hiltz
W. F. Purcell
By their Attorneys
Cooper, Kerr & Dunham

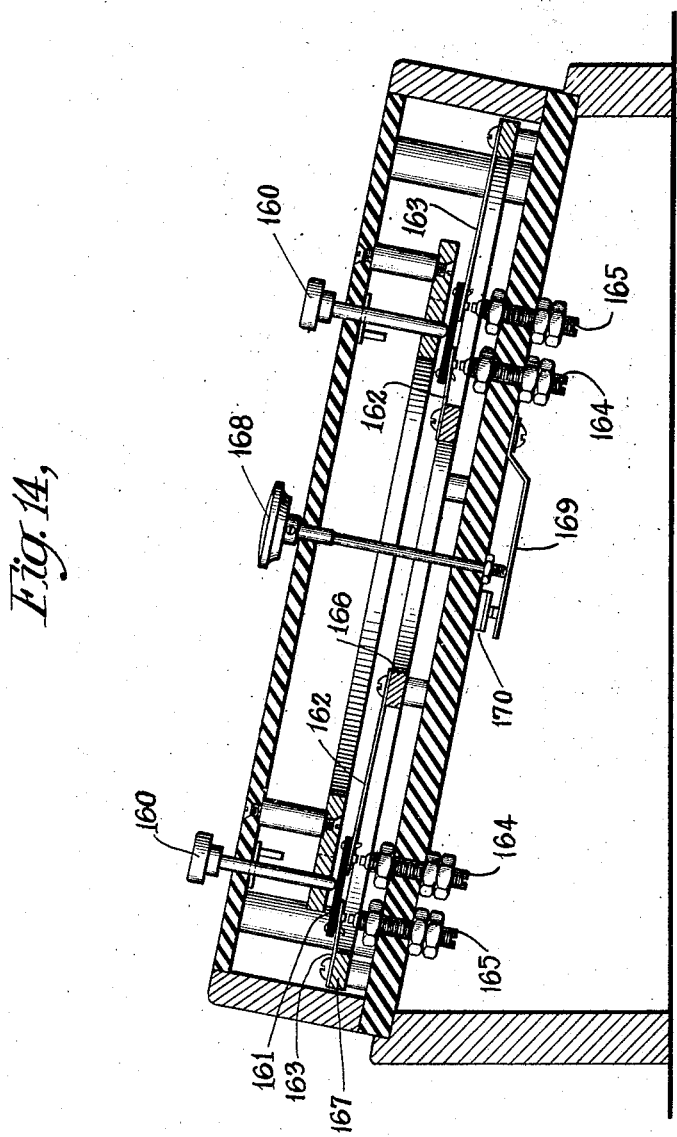

Patented May 7, 1929.

1,711,497

UNITED STATES PATENT OFFICE.

GEORGE S. HILTZ, OF BROOKLYN, NEW YORK, AND WILLIAM F. PURCELL, OF HOBOKEN, NEW JERSEY, ASSIGNORS TO STOCK QUOTATION TELEGRAPH COMPANY, OF NEW YORK, N. Y., A CORPORATION OF NEW YORK.

CURRENT-TRANSMISSION APPARATUS FOR PRINTING TELEGRAPH AND OTHER SYSTEMS.

Application filed May 22, 1926. Serial No. 110,850.

This invention relates to current distributing systems of the class in which several circuits are controlled by contact made through perforations in an insulating member, as for example a revolving disk or drum, or a longitudinally traveling strip, preferably paper, the perforations being punched in accordance with a predetermined code whereby the relative positions of the perforations in each cycle determine the circuits which are to be closed, or, generally, controlled. The chief object of the invention, briefly stated, is to improve such systems in the direction of simplicity of construction and reliability and speed of operation. To this and other ends the invention comprises the novel features and combinations hereinafter disclosed.

The invention finds important application in printing telegraph systems, and accordingly we have selected for specific illustration and description herein a printing telegraph system (for the sake of simplicity a system of the "one wire" type) in which our invention is embodied. In this and in certain other embodiments we employ manually actuated or controlled apparatus for punching a paper strip or tape according to a suitable position code. Suppose, for example, that provision is made for eleven perforations in a transverse line. These may be divided into two or more groups, say two, with four in one and seven in the other, or three, with two perforations in one group, three in another, and six in the third, etc. Then by permutation or combination or both we can control a much larger number of circuits. Thus we can combine each of four perforations in one group with each of seven in the other, making twenty-eight combinations, each of which can control a circuit. In the embodiment herein illustrated, the tape is fed through the punching apparatus step-by-step automatically and is passed to the contact mechanism comprising eleven insulated contact-fingers or pins arranged side by side in alignment with a narrow slot in the adjacent wall of a vessel containing mercury. As the tape travels between the pins and the mercury container the former are held insulated from mercury except when a perforation comes under a pin. The mercury can then pass through the paper into contact with the pin, thereby closing the circuit in which the pin is connected in series, which may be a main circuit or a relay circuit. The circuits controlled by the contact mechanism are connected with a printing telegraph transmitter, for example one of the sunflower type, by which a succession of current impulses of alternating polarity is transmitted over the line to the receiver or receivers, so that for each combination of contact circuits the proper number of current impulses will be transmitted. The feed of the tape through the contact mechanism is preferably step-by-step under the control of the receiver in such manner that at the completion of each printing operation the perforated tape will be fed forward one step. We also prefer to put the feed through the contact mechanism under the control of the punching apparatus so that if the punched tape is not supplied to the contact mechanism as fast as the receiver operates, the feed through the contact mechanism is stopped until the tape catches up, thus preventing damage to the tape with consequent misprinting at the receiver, and loss of time entailed by the necessity of rectifying the damage.

Our invention also includes means under the control of the punching operator for bringing the transmitter into unison with the receiver or receivers. It also includes means for repeating at high speed any desired letter or other character, thereby effecting a saving of time in transmission whenever, for example, a doubled letter occurs in a word, or the same digit in a number is to be repeated one or more times. It also includes means whereby the automatic operation can be interrupted and manual operation or control employed at the will of the operator at any time.

The embodiment outlined above is illustrated in the accompanying drawings, in which—

Fig. 2 is a section taken about on line 2—2 of Fig. 1, omitting the key-actuated mechanism which operates the punch-bars, such mechanism being merely the type-bar actuating mechanism of the typewriter above referred to.

Fig. 3 is a detail sectional view, taken about on line 3—3 of Fig. 1, showing the punching and contact mechanisms and their tape-feeding devices.

Fig. 4 is a detail section taken about on line 4—4 of Fig. 1, showing the punching and control mechanisms in section.

Fig. 4$^a$ is a detail sectional view illustrating a modification of the tape controlled contact mechanism.

Fig. 5 is a section on line 5—5 of Figs. 2 and 4, showing the mercury vessel, the mercury standpipes, the contact fingers or pins in their insulating support, and the insulating control tape, with the circuits all broken.

Fig. 6 is a detail section, on the same plane as Fig. 5 but on a larger scale, showing the contact mercury, the contact pins, and the tape, with the mercury in contact with two pins through perforations in the control tape.

Fig. 7 illustrates a piece of the control tape with feed perforations and transmitting or circuit-closing perforations.

Fig. 8 is a detail section on line 8—8 of Figs. 2 and 3, showing the transverse row of spring-retracted punches and a punch bar or hammer about to strike and actuate two of them.

Fig. 9 is a plan view of the transmitter, showing the unison device at one end and the repeat device at the other.

Fig. 9$^a$ is a detail view, partly in section, on line 9$^a$ of Fig. 9.

Fig. 10 is an end elevation of the transmitter, from the left of Fig. 9, showing the sunflower and the unison device.

Fig. 11 is an elevation of the repeat device, from the right of Fig. 9.

Fig. 12 is a diagram showing the wiring of the system, including the receiver or "ticker".

Figure 13:
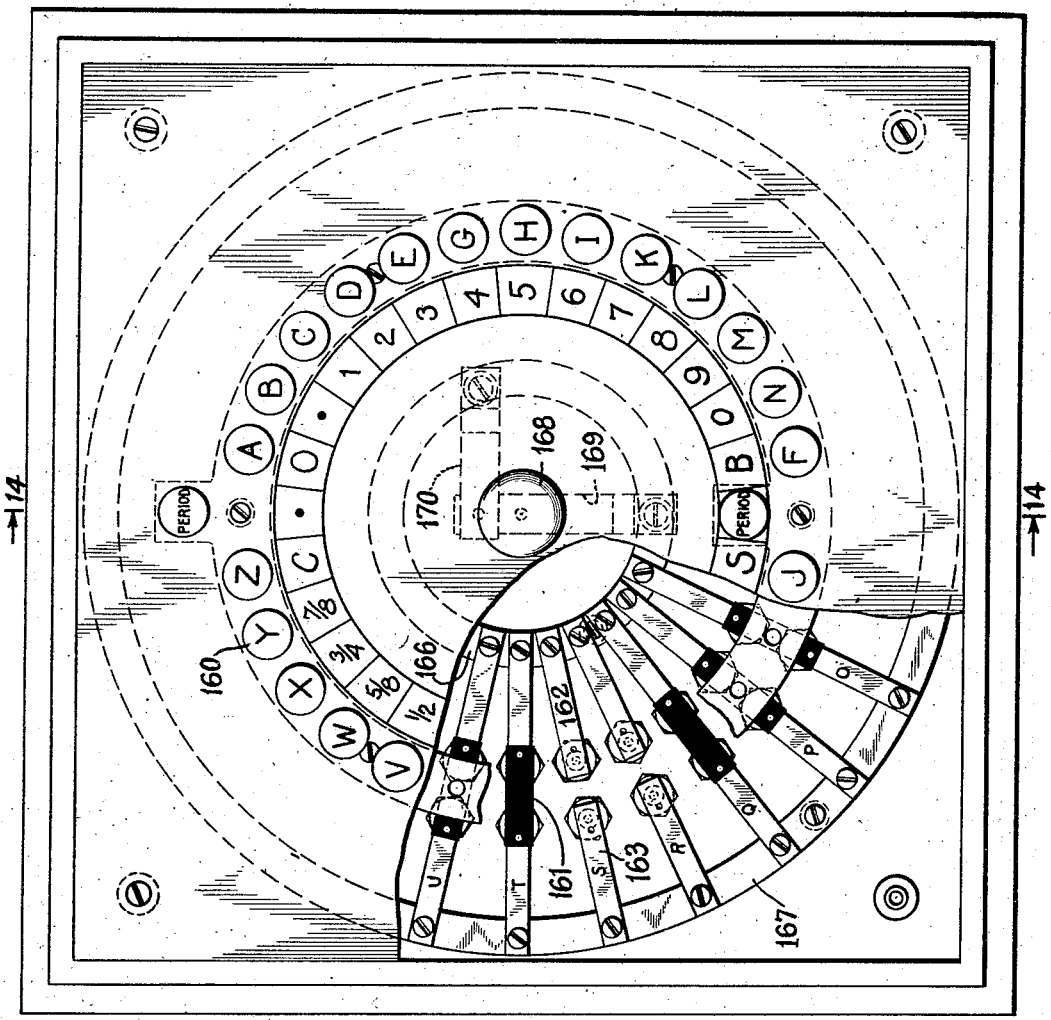

Fig. 13 is a plan view of the keyboard provided for manual transmission independent of the automatic mechanism, with parts broken away to show underlying parts.

Fig. 14 is a cross section on line 14—14 of Fig. 13.

Referring now to Figs. 1, 2, 3, 4 and 8, the support or carrier 10 is provided with a series of apertures for the spring-raised punches 11, which cooperate with the die-plate 12 below, to punch one or more perforations in a paper strip or tape fed step-by-step between the carrier and the die-plate. Thirteen openings in the carrier are shown, but two of these are used to hold stops 13 to arrest the hammers and thereby prevent actuation of punches other than the selected pair. The parts described are supported on spaced pillars 14, between which is a removable open topped receptacle 15 to catch the punchings from the die-plate 12.

Figure 1:
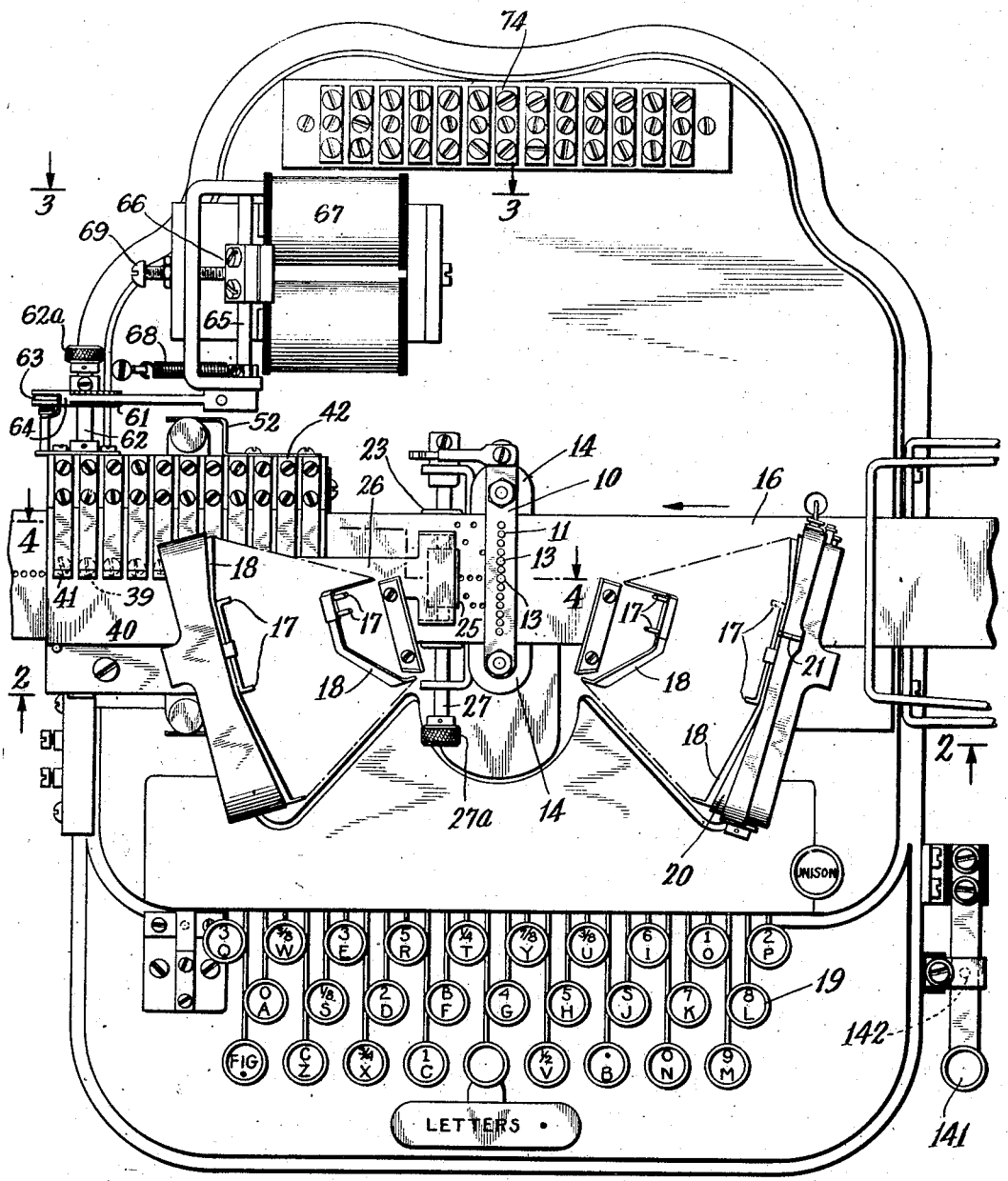
Fig. 1 is a plan view of the punching and contact mechanisms, the former being essentially similar in construction to a well known typewriter, with punch-actuating fingers or projections instead of type and with punches and cooperating dies instead of the usual platen.

The punches 11 are driven down into the die-plate 12 to punch the interposed tape 16, Figs. 1, 2 and 4, by fingers or projections 17 on the pivoted hammers 18 (see also Fig. 8) actuated by the keys 19 through the instrumentality of suitable mechanism which is well known in the typewriter art and which therefore need not be illustrated in the present application. These fingers are mounted in groups of two or more according to the number of holes to be punched, the fingers of the several groups being arranged and spaced differently, so as to actuate the punches according to a predetermined code. For example, the fingers 17 in the group of two shown in Fig. 8 are spaced and located (with respect to the punches 11) to actuate the first and seventh punches, counting from the left. When the two perforations thus made in the tape reach the contact mechanism, a number of current impulses will have been sent over the line by the transmitter, as explained hereinafter, and the receiver or receivers will print the corresponding letter, digit, or punctuation mark. Other fingers 17 are spaced to actuate the first punch and the fifth, the first and the sixth, etc., and still others are located and spaced to actuate the second and the fifth, and so on. That is, with each actuating finger or projection for a punch of the group of four at the left (Fig. 8) there is associated a finger for one or another of the other group, containing seven punches. Thus with eleven punches we obtain twenty-eight circuit-controlling combinations. With the same number of contacts (eleven) divided six and five instead of seven and four, thirty circuits can be controlled if as many as that are desired. In general, the number of circuits is the number of contacts in one group multiplied by the number in the other. It can be shown mathematically that with a given total number of contacts the number of circuits controllable thereby approaches a maximum as the groups approach equality, and vice versa, for a given number of circuits the total number of contacts required approaches a minimum as the groups approach equality. Thus, if $x$ and $y$ are the numbers of contacts in the two groups, the number of circuits is $u=xy$. If the total number of contacts $x+y$ is constant, $u$ has its maximum value when $x=y$. Similarly, if $u$ is constant, $x+y$ has its minimum value when $x=y$.

Fig. 7 shows a portion of the punched tape 16. The longitudinal row of equispaced perforations was made by the feed sprocket 23, Fig. 4. The other perforations, in transverse groups of two each, were made by the punches 11, Fig. 8. It is to be understood that the number of perforations per "group" is not, in general, limited to two, since we may use any convenient and suitable number depending upon the functions to be performed.

One punching hammer, shown at 20 in Fig.

1, has only one punch-actuating finger, 21, arranged or located to actuate a predetermined punch for the purpose explained hereinafter.

The insulating tape 16 is fed step-by-step through the punching mechanism (and off the supply roll 22, Fig. 2) by a sprocket roller 23, Fig. 4, whose teeth cooperate with a circumferential series of recesses 24 in a cramp roller 25 rotatably mounted on the end of a spring arm 26, which holds the die or upper feed roller 25 down on the sprocket roller with yielding but adequate pressure to insure perforation of the tape and step-by-step feed thereof as the sprocket roller is rotated step-by-step. The teeth on the sprocket roller and the die openings in the die-roller are in line with one or the other of the stops 13.

The sprocket feed roller 23, Fig. 4, is fixed on a shaft 27, on which is also fixed, at one end, a ratchet 28, Fig. 3, prevented from backward rotation by the holding pawl 29 and rotated in the forward direction, to draw the insulating tape through the punching devices, by means of a pawl 30, yieldingly held in engagement with the ratchet by a spring 31. The pawl 30 is pivotally mounted on a pivoted arm 32, raised by a spring 33 to actuate the ratchet and depressed to carry the pawl backwardly over the ratchet (through a little more than the space of one tooth) by a link 34 connected to a bar 35 which in the present apparatus is the same as the "universal bar" of a typewriter, which rises on the up-stroke of the keys to feed the paper carriage forward. That is, as one of the keys 19, Fig. 1, is depressed, the bar 35 is depressed, carrying the pawl down over a tooth on ratchet 28, and as the key rises the bar is released, permitting the spring 33 to raise the arm 32 and thereby rotate the ratchet one step and advance the tape one step. The shaft 27 is provided at one end with a small wheel or knob 27ª which can be rotated manually to advance the tape independently of the punching devices at any time, as for example in starting the tape through the machine.

Beyond the punching mechanism, in the direction of movement of the tape, is the mercury contact mechanism, best shown in Figs. 1, 2, 3, 4, 5 and 6. This mechanism includes an insulating block 36, which may be made of fibre, hard rubber, bakelite, or other suitable material, having a transverse series of openings to receive a transverse series of contact pins 37, eleven in number, corresponding to the eleven perforation positions in the control tape 16. These contacts 37 may be wires of brass or copper or any suitable metal, fitted tightly in the holes in block 36, and are shown bent alternately rightwardly and leftwardly on top of the block to connect with terminals 38, which are in turn connected to terminals 39 mounted in the removable insulating cover plate 40 and engaged by contact springs 41 which may be connected with the controlled circuits by means of binding posts 42. Below the contact-pin assembly is a block or plate 43 of suitable insulating material, having a transverse chamber divided into two non-communicating chambers or compartments 44, 45, by a wall 46. These chambers contain two bodies of mercury, insulated from each other and thus constituting insulated contacts, each common to the groups of pin-contacts immediately above. At their outer ends the chambers are provided with metal standpipes 47, 48, swiveled in the block as indicated in Fig. 5, and provided with screw-plug closures 49. The top wall of each chamber is slotted, as at 50, 51, Figs. 4, 5 and 6, and the chambers are charged with enough mercury or other suitable conducting liquid to extend sufficiently high in the standpipes to afford a "head" adequate to carry the mercury up through the slots and into contact with the contact pins, as clearly indicated in Fig. 6. When it is desired to remove the contact assembly 36—40 (by sliding it out from under the spring terminals or brushes 41), or when it is desired to raise it to permit insertion of the tape, the standpipes 47, 48 are first turned down, as indicated in dotted lines in Fig. 2. The mercury then runs down into the standpipes and loss by outflow through the contact slots 50, 51 is prevented. The bodies of mercury in the two chambers 44, 45, are connected with the external circuits by stiff spring brushes 52, 53, mounted on the insulating block 43 and bearing on the metal standpipes 47, 48. We prefer the mercury contact mechanism described, but we may use spring contacts or brushes to engage the contacts 37 through the holes in the tape, as in Fig. 4ª, for example, in which is shown one of a row of brushes 37ª arranged in a recess in the insulating body 43, below the registering row of contacts 37, the brushes being electrically connected in insulated groups of four and seven each, corresponding to the grouped contacts 37.

As indicated in Fig. 1 the contact mechanism is aligned with the punching mechanism in the path of the tape through the latter, and it will be understood that the contact pins 37, Figs. 5 and 6, are individually aligned (in the path of the tape) with the respective punches 11, Fig. 1. The wall 46, Figs. 5 and 6, is located in line with one of the hammer stops 13, Fig. 8. The perforations made by the feed sprocket 23, Fig. 4, are in line with the other stop 13, and to prevent mercury from entering these feed perforations the slot 51 in mercury chamber 45, Figs. 5 and 6, is spanned by an insulating block or bridge 54.

The perforated control tape 16 is drawn through the contact mechanism by a sprocket feed-roller 60, Fig. 4, rotated step-by-step by a ratchet 61 on the same shaft 62, Figs. 1 and 3. The ratchet is actuated by a pawl 63 on an arm 64 fixed on the shaft 65 to which the armature 66 of the feed magnet 67 is fixed. When the magnet is energized the pawl is advanced and rotates the ratchet, and when the magnet is de-energized the spring 68 retracts the armature and pawl. The extent of the retraction of the pawl, and the forward feed of the tape at each cycle, are regulated by a screw 69 cooperating with the armature 66. The feed shaft 62 is provided at one end with a knurled knob 62ª by which it can be rotated manually to advance the tape whenever desired, as in starting.

As will be seen later, the circuit of the tape-feed magnet 67, of suitable time-constant to insure proper feed of the tape, is closed (preferably through a suitable relay) whenever an imprint is made at the receiver or "ticker", and is opened when the resulting forward feed of the tape breaks the transmitter control circuits.

The circuit of the tape-feed magnet 67 is under the control of the punching mechanism, so that if the sending operator does not punch the tape fast enough to keep up with the transmitter the feed sprocket 60, Fig. 4, will not be rotated, thereby preventing damage to the tape when the latter is held by the cooperating feed sprocket 23 and roller 24. For this purpose the magnet circuit contains a pair of normally closed contacts 70, 71, Figs. 5 and 12, one carried by a spring 72 which in turn carries a light bar 73 extending under the contact mechanism. The tape between the latter and the punching mechanism is looped under the bar, as shown in Figs. 2 and 4. Now if the tape is not supplied from the punching mechanism at least as fast as it is passed on by the feed magnet 67 the shortening loop will eventually lift the bar 73 and thereby break the magnet circuit, whereupon the tape stops in the contact mechanism until the punching mechanism catches up.

At the back of the punching and contact apparatus shown in Fig. 1 is a row of binding post terminals 74, thirteen in number, eleven of which are connected with the contacts 37, Figs. 5 and 6, for the output to the transmitter. The other two may be used for the input from the source of current.

Referring now to Figs. 9 and 12 (in the latter figure the two annular series of contacts at the lower left are disregarded for the present), 80 is a constantly running motor supplied with current from any suitable source through binding posts 81 and a switch 82 and having field and armature rheostats 83 of conventional design for close control of speed. At one end of the motor is a commutator shaft 84 connected to the armature shaft 85 by a friction clutch 86 and connected by pinion 87 and gear 88 to the shaft of the wiper 89 to rotate the latter over the sunflower. In the particular machine illustrated the gear reduction is 14 to 1. The shaft 84 operates a commutator or pole-changing switch comprising slip rings 90, 91 on the shaft, engaged by brushes 92, 93, 94, the first brush being connected to ground and the other two to the relay magnets 95, 96, the armature of which (not shown) is connected through the tape-feed relay 97 to the receiver or receivers on the line and plays between a pair of contacts 98, 99 connected to the current supply mains 100, 101. This relay may be of conventional design and hence need not be further described. Suffice it to say that when the commutator is in the position shown in Fig. 12 relay magnet 96 is energized, causing the relay armature to swing over to contact 98, for example, thereby sending a positive impulse to the ticker 102. When the rotation of the commutator shaft 84 brings the insulating segment 103 (on ring 91) into cooperation with brush 94 the circuit is broken through magnet 96 and closed through magnet 95, thereby sending a negative impulse, as will be readily understood. These impulses operate the ticker escapement, the magnets of which are shown at 104, and thus cause step-by-step rotation of the ticker typewheel to bring the desired character to the printing position. The escapement magnets have a short time-constant and are therefore quick-acting, while the press or printing magnet 105, in series therewith, is slow. Hence the press magnet is not sufficiently energized by the rapidly alternating impulses on the line to actuate its armature (not shown herein), but is sufficiently energized by prolonging the last impulse (of whatever polarity it happens to be) and hence can operate the printing mechanism only after the type-selecting movement of the type-wheel has been completed. The receiver or "ticker" may be of any suitable type, or for example that shown in the prior patent of George S. Hiltz, No. 1,085,124, issued January 27, 1914. In that receiver the typewheel has two annular rows of characters, for the letters of the alphabet, punctuation marks, numeral digits, fractions, and any other other desired symbols, half the characters being in one series and the rest in the other. That is, each row or series has twenty-eight of the fifty-six printing type provided. As explained hereinafter, either row is selected for printing at the will of the sending operator by any suitable means, as for example the means described in the patent above mentioned.

On the commutator shaft 84, Figs. 9 and 12, is an electromagnetic clutch or stop, 109, which may be of the type shown in patent of John Burry No. 540,420, issued June 4, 1895. This clutch is connected across the current supply mains 100, 101, and is controlled by a relay 110, also connected across these mains but in series with the two bodies of mercury 44, 45, in the contact mechanism, Figs. 5 and 6. It will therefore be seen that the clutch will be energized, to arrest commutator shaft 84 (and wiper 89) against the torque transmitted through the friction clutch 86, whenever the two insulated bodies of mercury are bridged or electrically connected together. It will also be seen that so long as the clutch is de-energized the commutator will be rotated by the constantly running armature shaft of motor 80, thereby sending alternating impulses over the line; and that the wiper will be rotated over the sunflower in harmony with the commutator.

The bridging of the two bodies of mercury, 44, 45, Figs. 5, 6 and 12, to arrest the commutator shaft 84 as just explained, is effected by the contacts 37 and the sunflower and wiper, 89. As shown in Fig. 12, the wiper, insulated from commutator shaft 84, has two spring fingers, 115, 116, the former cooperating with an annular series of four inner sunflower-contacts 1, 2, 3, 4, of equi-angular extent, the other finger cooperating with an annular series of twenty-eight outer contacts, two of which are shown marked with a period, and the others with the twenty-six letters of the alphabet. Each of these outer contacts is connected in parallel with the seventh succeeding contact (counting in the anti-clockwise direction, Fig. 12), thus forming what may be conveniently termed "sets" of contacts and dividing the entire series into as many "groups" as there are contacts in each set. In the present machine there are four in each set, making four groups of seven contacts each, as follows: period, A, B, C, D, E, G; H, I, K, L, M, N, F; period, J, O, P, Q, R, S; and T, U, V, W, X, Y, Z. Each group is of the same angular extent as the adjacent inner contact 1, 2, 3 or 4, and each inner contact is common to all the contacts of the adjacent outer group. The inner contacts are connected individually to the four contacts 37 at the right of the series. In the machine illustrated, outer contacts A, I, J, U constitute a set, and these are in parallel with each other but in series with a contact 37. Contacts G, F, S, Z form another set, connected to another contact 37. Thus each of the first seven contacts 37 (counting from the left) is a "set-contact". The inner contact 1 is common to the first "group" of seven outer contacts (counting anti-clockwise in Fig. 12), contact 2 is common to the second group, and so on. The inner contacts can therefore be conveniently termed "group-contacts". Similarly, mercury 44, common to the seven set-contacts 37, may be termed a "common set-contact"; and mercury 45, common to the four group-contacts 37, may be termed a "common group-contact". In like manner the circuits controlled by the several contacts may be described as connected in sets and arranged in groups. It is to be understood, however, that the "sets" and "groups" of circuits and contacts can be variously constituted and are not limited to the layout herein specifically illustrated. It is also convenient to refer to the sunflower contacts as "primary" contacts and to the contacts 37 as "secondary" contacts. In Fig. 12 the wiper 89 is shown engaging outer contact A and inner contact 1. These two are therefore bridged. Assuming now that the transmitter and the receivers are in unison, and that the letter K, for example, is to be printed: This letter is the eighth from A (counting anticlockwise on the sunflower) which means that eight impulses must be sent over the line to bring K to the printing position, and that the wiper must be arrested when it reaches contact K so as to prolong the last impulse and cause energization of the press magnet. At the instant represented in Fig. 12 the circuit of clutch relay 110 is closed through two perforations in the control tape (not shown in Fig. 12) under the second and eleventh of the contacts 37, counting from the left, that is, the second "set-contact" and the fourth "group-contact". The circuit through these pins, the two bodies of mercury, the sunflower contacts A and 1, the wiper fingers 115, 116, and clutch relay magnet 110, is therefore closed, and the wiper is held stationary. As the control tape moves on, the perforations which established the circuit just traced are carried out of register with the contact pins, thereby breaking the circuit. This de-energizes the magnetic clutch or brake 109, whereupon the wiper starts counterclockwise and at the same time alternating impulses are sent over the line by the commutator. Before the wiper passes sunflower contact B the advance of the control tape brings the K pair of perforations into register with the third and tenth of contacts 37. It will be observed that this third contact 37 is in series with the sunflower contact B, but when finger 116 reaches the latter the circuit is not closed, inasmuch as finger 115 is still on contact 1, which is insulated from contact 2. Consequently the wiper continues its counterclockwise movement. When the wiper reaches contacts H and 2 the circuit is still open, since there is no tape-perforation under the first of contacts 37, with which contact H is connected, but when the wiper finger 116 reaches contact K, and there has therefore been sent over the line the number of impulses needed to rotate the type wheel from A to K, the circuit is closed through mercury 44, third contact 37, contact K, wiper fingers 116 and 115, contact 2, and tenth contact 37; whereupon the magnetic clutch or brake 109, energized by this closing of the circuit through relay 110, arrests the shaft 84 with the wiper on contacts K and 2, thereby prolonging the final impulse and causing press magnet 105 to act. This prolonged impulse holds the circuit of the tape-feed magnet closed (at relay 97) long enough for the tape-feed magnet 67 to act and advance the tape another step, whereupon a cycle similar to that described above is performed, that is, the wiper will move until it reaches the sunflower contacts which are connected to the line through the mercury bodies 44, 45, and the selected pair of contacts 37; unless the latter or character last printed is to be repeated. The repeating mechanism and its operation will now be described.

Referring to Figs. 9, 9ª and 11, at the end of motor 80 opposite to the sunflower, is a short shaft 120 driven at suitable speed from the motor armature shaft 85 by pulleys 121, 122, and belt 123, and having a screw thread 124, which may be of the ratchet type. This thread is engaged by an arm 125 carrying an insulating stud 126 and mounted in a stud 127 to swing on a horizontal axis, the stud 127 itself being mounted to rock on a vertical axis, the arm thus being capable of universal swinging movement. A light spring 128 urges the arm leftwardly against the rightward movement imparted by the screw thread rotating in the direction of the arrow applied to shaft 85, and also urges the arm downwardly into engagement with the thread. Underneath the arm is a finger 129, carried by the armature 130 of the repeat magnet 131 and held normally in raised or upper position by a spring 132. Contact 133, carried by an adjusting screw 135 is an insulating post 136, cooperates with a contact 137 on a vertical spring arm 138. The upward movement of the lifting finger 129, and hence the lift of repeat-arm 128 also, is limited by a stop 139 carried by the standard 140 in which shaft 120 is journaled. Contacts 133, 137 are in series with the tape-feed relay 97 (see Fig. 12), which is in the transmission line to the ticker; while the repeat magnet 131 is in series with the magnetic clutch-brake 109. It will be seen that so long as the repeat magnet is de-energized the arm 125 is held up, as in Fig. 11, out of engagement with the screw 124, and is held in retracted position by spring 128. Contacts 133, 137 therefore remain closed. When, however, the magnet is energized the finger 129 is lowered, arm 125 is drawn into engagement with the screw, which, constantly rotated by shaft 120, carries the arm rightwardly and (if the operation is continued long enough) brings the arm 125 against contact spring 138, thereby bending the latter and separating the contacts 133—137. This opens the line circuit, and, through the medium of the relay 97, opens the circuit of the tape-feed magnet 67 also. Being thus de-energized, the latter permits the spring 68, Fig. 3, to rock the armature 64 and retract the feed-pawl 63 over the feed-ratchet 61 into position to rotate the ratchet and feed the tape forward another step at the next energization of the feed magnet. The repeat operation will now be readily understood.

Assuming that the word UTTER, for example, is to be printed, the operator punches the tape for the four different letters, repeating the T-perforations. When the wiper comes to contacts U—4 on the sunflower, Fig. 12, the clutch 109 is energized in the manner already described, thereby arresting the commutator shaft 84, and, by thus prolonging the last impulse, causing U to be printed by the ticker. (This impulse may be either positive or negative, for example positive.) At the same time the relatively slow-acting tape-feed relay 97 is energized by the prolonged impulse and closes the circuit of tape-feed magnet 67, thereby advancing the tape one step and bringing the first pair of T-perforations to contacts 37. This movement of the tape opens the clutch-relay circuit, whereupon the clutch lets go and the wiper starts again. As soon as it passes off of contacts U—4 a negative impulse is sent over the line by the commutator, which tends to reverse the residual polarity of the poles of the tape-feed relay magnet 97. The consequent decrease of the strength of the field of this relay magnet 97 is sufficient to cause the magnet to let go of its armature instantly, thereby breaking the circuit of feed magnet 67. We now have the following condition: The wiper 89 is traveling counterclockwise away from sunflower contacts U—4 toward contacts T—4; the commutator is sending alternating impulses over the line (which are causing rotation of the ticker type-wheel in unison with the wiper); the clutch-relay 110, clutch 109, and repeat magnet 131 are de-energized; the tape-feed relay 97 is de-energized; the tape-feed magnet 67 is de-energized; and the feed pawl 63, Fig. 3, is in position to advance the tape at the next energization of the feed magnet. When the wiper reaches contacts T—4 the clutch relay circuit is established, the clutch is energized (arresting the commutator shaft 84 and causing T to be printed), and the tape-feed relay 97 is energized. The tape thereupon advances and breaks the clutch relay circuit at contacts 37 but by bringing the second pair of T-perforations to these contacts the tape re-establishes the clutch relay circuit through sunflower contacts T—4 before the clutch itself has time to de-energize and permit the wiper to start again. Hence the wiper remains ("freezes") on contacts T—4 and letter T is again printed by the ticker. While this is going on, however, the slow-acting repeat magnet (in series with the clutch) is energized by the double prolongation of the printing impulse, thereby actuating its armature and permitting arm 125 to be drawn down into engagement with the constantly rotating screw 124 on shaft 120, Figs. 9 and 11, whereupon the screw carries the arm rightwardly and causes it to break the circuit of the feed magnet 67 by separating contacts 133, 137. The screw is so arranged on its shaft that at the instant of breaking this circuit the end of the thread passes the arm, thus permitting the spring 128, Fig. 9, to swing the arm back (immediately after the break) against the adjacent convolution of the screw, thus immediately re-establishing the feed circuit. In short, the repeat magnet breaks the feed circuit, allowing the feed-pawl 63, Fig. 3, to be retracted, then the feed circuit is closed again, thereby re-energizing the feed magnet and causing the tape to advance another step. This carries the second pair of T-perforations out from under the contacts 37, thereby breaking the circuit of the clutch relay 110 at the latter contacts. The E-perforations thus brought to the contacts 37 bridge there the contacts for the letter E, but do not, of course, re-establish a circuit through the clutch relay, since the wiper is on contacts T—4. Consequently the clutch relay 110, clutch 109, and repeat magnet 131, have time to de-energize before the screw 124 can come around again and repeat the above-described opening and closing of the feed circuit. Instead, the de-energization of the repeat magnet allows spring 132, Fig. 11, to lift the finger 129 and thereby raise the arm 125 out of engagement with the screw. The de-energization of the clutch relay not only breaks the circuit of the repeat magnet but also, by de-energizing the clutch, causes the wiper to start again and sent alternating impulses over the line. The first of these impulses de-energizes the tape-feed relay 97, thereby opening the feed magnet circuit and causing the feed pawl 63, Fig. 3, to be retracted into position to advance the tape again when the wiper reaches contacts E—1 and by consequent energization of the clutch 109 causes the final impulse to be prolonged. Suppose that instead of punching only two pairs of T-perforations the operator had punched three pairs. Then when the third pair comes to the contacts 37 the letter T is printed the third time, the repeat magnet remains energized, the feed magnet circuit is opened by screw 124 but is immediately closed again in the manner described, and the tape is fed forward. It will therefore be seen that so long as the operator punches T-perforations the tape will be fed forward in harmony therewith but that the wiper will remain on the T—4 contacts of the sunflower instead of having to make a complete revolution (from T—4 back to T—4) between each imprint. Of course the same is true of any other letter.

It will be understood that the number of alternating impulses which must be sent in uninterrupted sequence over the line to bring a given character on the ticker typewheel to the impression point is not constant but depends upon the number of sunflower contacts between it and the previously printed character. For example, Fig. 12 shows the wiper in position to print the letter A. If the next letter to be printed is L, eighteen impulses must be transmitted uninterruptedly; but if there is an intervening letter, say D, it will require only twelve impulses to bring L to the printing position after D has been printed. It will also be seen that this mode of operation requires the transmitter and the receiver to be in step, that is, in "unison". From one cause or another the two sometimes get out of unison, and whenever this happens the sending operator brings the receiver back into unison by causing the ticker typewheel to rotate a sufficient number of times, or a sufficient number of steps, without printing. This is done by sending over the line a sufficient number of alternating impulses. For this purpose provision is made by which an adequate number of impulses can be transmitted automatically but at the will of the sending operator. The means provided includes a simple spring key-contact 141, Fig. 1, and an overhanging contact 142. These contacts are normally closed, and are in series with the "letters-period" contact on the sunflower, as shown in Fig. 12. This "letters-period" contact is the left one of the two uppermost contacts in Fig. 12, and is marked with a dot. It is employed after each word to space it from the next word and consequently it is frequently used. It will be observed that if the key 141 is depressed at any time, thereby opening the connection between contact mechanism 37—44 and the letters-period contact on the sunflower, the circuit of the clutch relay 110 will not be closed when the next letters-period perforations come to the contacts 37. On the contrary this circuit remains open. Consequently the circuit of clutch 109 remains open, and hence the wiper revolves indefinitely—or would so revolve except for the action of the mechanism now to be described.

Referring to Figs. 9 and 10, shaft 145, carrying the wiper 89, is provided with a thread 146, preferably of the ratchet type. This thread 146 can be engaged by one arm of a lever 147 pivoted to rock on a horizontal axis in the stud 148 which is itself pivoted to rock on an axis at right angles to the former, the lever being thus capable of universal swinging movement. The arm is urged downwardly into engagement with the screw 146 and also toward the right (Fig. 9) by a spring 149 (Fig. 10), and has its outer arm under the overhanging armature 150 of the unison magnet 151. The upward swing of this armature, and consequently the downward or counterclockwise movement of the lever 147, under the influence of spring 149, is regulated by an adjustable screw-stop 152, while the rightward swing of the lever (Fig. 9) is limited by the upright portion 150ª of the armature. The lever carries an arm 153 to cooperate with a spring contact 154 as the lever is swung to the left by screw 146 and carries the contact into engagement with a contact 155. These contacts 154, 155, normally open, are connected across mercury 44 and the letters-period contact on the sunflower, as indicated in Fig. 12. The operation will now be readily understood, as follows.

Suppose the operator (who usually has before him a ticker in series with the distant tickers) observes that his ticker is out of unison. He immediately opens the "letters-period" circuit by depressing key-contact 141 and holds it open. Between the contact mechanism 37—44—45 (Fig. 12) and the punching mechanism is a loop of tape bearing numerous pairs of perforations, which include numerous pairs of "letters period" perforations for spacing the words or numbers apart. Evidently the opening of the circuit mentioned by depressing key 141 cannot in any case have any effect upon the operation until the next letters-period perforations come to the contacts 37. But when this happens the letters-period circuit is not closed, since there is a break in it at contacts 141, 142. Consequently the wiper does not stop on the letters-period contact but keeps on rotating, thereby sending alternating impulses over the line which cause the ticker typewheel to rotate until brought to rest by the ticker unison mechanism (which may be of the construction described in the prior patent of George S. Hiltz, above mentioned) with the letters period, or, in general, the "space", at the impression point. While this is going on the unison magnet 151 is not energized, since it is in series with the clutch 109. Consequently the unison lever 147 is held down by spring 149 in engagement with the unison screw 146, which rapidly carries the arm leftwardly (Fig. 9), bringing it up to spring contact 154 and closing it upon contact 155. The gap made in the letters-period circuit by depression of key 141 is thus bridged, so that the next time the wiper comes around to the letters-period contact the circuit of the latter is closed; whereupon the clutch is energized, the wiper stops on the letters-period contact, the impulse then flowing over the line is prolonged, the ticker prints a period (or leaves a space), and the transmitter and ticker are ready to start off again in unison when the operator releases key 141. At the same time, the unison magnet 151, in series with the clutch 109, is also energized, thereby rocking its armature and lifting the unison lever 147 out of engagement with the screw, whereupon the spring 149 rocks the lever over to its extreme rightward position. In the normal operation of the system the energization of the unison magnet occurs so frequently that it is never left in engagement with the screw long enough to close the contacts 154—155.

The "speed" of the system as a whole cannot be, in general, any greater than the speed at which the receiver or receivers can operate. This is usually much less than the speed of the operator in punching the tape, and hence a considerable length of the latter may accumulate between the punching and contact mechanisms, thereby permitting the operator, in such circumstances, to give his attention to other duties. During such a period the receivers might get out of unison without his perceiving it and hence without its being rectified promptly. To take care of such conditions provision is made whereby the unison mechanism can be brought into operation automatically at suitable intervals, long or short according to the operator's judgment, without the necessity of actuating the key 141. For this purpose the punching apparatus is provided with a hammer 20, Fig. 1, having only one punch-actuating projection or finger (21). This projection is positioned to actuate the punch corresponding to that one of the contacts 37 which is connected to the inner sunflower contact 1, that is, the contact 37 at the extreme right of the series in Fig. 12. From time to time the operator strikes the key marked "unison" in Fig. 1, which causes this one perforation to be punched. Now when this one hole comes to the contact mechanism the clutch relay circuit is not closed since mercury 44 is not simultaneously connected with one of its contact pins. Consequently the wiper continues to revolve, the unison magnet 151 is not energized, and the unison lever continues in engagement with the screw 146 and eventually closes contacts 154—155 as previously described. By this time the receiver type-wheels have been rotated several times and arrested at the unison position. The next time the wiper comes to the letters-period contact on the sunflower it finds connection already made between mercury 45 and contact 1 by the unison-hole in the tape, and between mercury 44 and the letters-period contact by the contacts 154—155; and the arrival of the wiper on the letters-period contact connects the same with contact 1, thereby completing the clutch relay circuit, whereupon the clutch is energized, the wiper is arrested, the ticker "prints" a space (or a period), the unison magnet is energized, the unison lever is retracted, contacts 154—155 are separated, the clutch relay circuit is broken by the separation of the latter contacts, the clutch is de-energized, and the wiper starts again in unison with the receivers. It is customary, though not necessary, for the operator to punch the tape for letters period immediately after the single (or unison) perforation, thus causing two periods to be printed on the receiving tape (or two spaces to be passed) and giving him reassuring visible indication,. if he happens to be looking, that the system has actually been brought to unison.

The operation of the unison mechanism, initiated in either of the above ways, is rapid, being limited in speed only by the speed with which the receiver escapements can respond to the alternating impulses sent over the line. In practice the speed of the motor 80 that drives the wiper and commutator is preferably regulated (as by means of the rheostats 83) to a speed as close as possible to but not higher than the maximum speed at which the escapement can respond with certainty.

It is a fact well understood in the art that in systems in which the operation of the receiver is controlled by sending a succession of current impulses over the line, especially in one-wire systems, the speed of the receiver is necessarily limited by the speed with which the typewheel escapement can operate and the speed with which the press magnet can respond to the printing impulse. The sensitiveness of this magnet cannot be increased beyond a certain point, since it must not be sensitive enough to respond to the relatively short impulses which energize the escapement magnets. On the other hand, in systems where the transmitter is controlled directly from a key-board a practiced operator can always manipulate the keys much faster than the receiver or ticker can operate, and he must therefore adjust his own speed to that of the receiver. This introduces the personal equation, and hence every operator is at times too slow, others habitually so. Some frequently get ahead of the receiver, thereby putting the system out of step and necessitating correspondingly frequent return to unison with consequent loss of time. The net result is that the system is seldom if ever operated at top efficiency. In the system described herein, the personal equation is in effect eliminated. The operator can punch the tape as fast as he likes and can accumulate as much matter on the tape as he pleases. The transmitter then takes it at the maximum speed of the receivers. This follows from the fact that the speed of the tape through the contact mechanism which controls the transmitter is dependent upon the speed of the receiver, since the tape feed does not occur until the printing impulse is transmitted and hence the feed is never out of step with the press magnet. The system therefore operates at maximum efficiency, with a substantial increase in net output over systems in which direct keyboard control is employed.

It sometimes happens that the operator is given instructions to "kill" or "throw out" certain matter which has been given him for transmission. If the matter to be deleted has already been punched he cuts out the necessary part of the tape and splices the ends or simply threads the tape into the contact mechanism again when the break reaches the latter. Later the instructions may be countermanded. If the tape has already been cut, the re-insertion of the deleted matter would entail starting a new tape and re-punching all the matter following the cut, which would mean loss of time and labor. Sometimes, too, it is desirable to send an important item out over the system immediately. Such an item is known as a "flash". In order to send it the operator would have to cut the tape and start a new one, as in the case of re-insertion of a "kill" or "throw", with similar delay. In order to avoid such delay, which may result in serious loss to other persons, as for example when the tickers are reporting prices in an active "market", provision is made whereby the operator can at any time interrupt the automatic transmission and transmit manually, resuming the automatic operation as soon as the "flash" or the "throw" has been sent. The keyboard mechanism provided for this purpose is illustrated in Figs. 12, 13, 14, to which reference is now made.

The keyboard shown in the figures just mentioned comprises an annular row of twenty-eight plunger keys 160 resting on insulating bars 161 which span the inner and outer annular rows of insulated spring contacts 162, 163, cooperating with underlying stationary insulated contacts 164, 165, so that when any key is depressed the two springs will be carried down into engagement with the corresponding contacts below, as will be readily understood. As shown in Fig. 12, the inner spring contacts 162 are electrically connected to the annular bus 166, which is itself connected to current supply main 100, while the outer springs 163 are connected to the outer annular bus 167 which is connected through clutch relay 110 to main 101. The inner fixed contacts 164 are connected in four groups of seven each, corresponding to the inner contacts 1, 2, 3, 4 of the sunflower, and the groups are connected individually to the four right hand upper terminals of the double-throw switch 168. The outer contacts 165 are connected in four groups of seven each in exactly the same manner as the outer contacts on the sunflower, and are connected with the corresponding seven contacts 37 of the mercury contact mechanism. The other contacts 37, normally cooperating with the mercury 45, are connected to the four upper left hand terminals of switch 168, while the upper four of the inner terminals of the switch are connected with the inner group of sunflower contacts 1, 2, 3, 4. It will therefore be seen that when the switch is in the left hand position, shown in Fig. 12, the keyboard is cut out of the system, but that when the switch is in the right hand position the mercury contact mechanism is cut out and the keyboard cut in. The outer bus 167 then takes the place of mercury 44, the inner bus 166 takes the place of mercury 45, the four groups of inner contacts 164 take the place of the four right hand group-contacts 37, and the seven groups of outer contacts 165 take the place of the set-contacts 37; while the keys 160, serving to close individually the gaps normally existing between contacts 163 and 165, and between contacts 162 and 164, take the place of the perforated tape. Throwing the switch to the right also cuts out the unison contacts 154—155, which are connected between main 100 and the lowermost inner contact of the switch; and at the same time the circuit of the tape-feed magnet 67 is broken at the fifth (from the top) of the left hand switch terminals. Similarly, the lowermost of the right hand switch terminals and the sixth of the center terminals (counting from the top) lay a shunt across the repeat magnet 131.

Assume now that with the switch in its rightward position and with the wiper 89 on sunflower contacts A—1, the F key is depressed. This closes the keyboard contacts F', Fig. 12; then as soon as the wiper reaches sunflower contacts F and 2 current flows from main 101 through wire 101ª, clutch relay 110, wire 110ª, to the outer bus-ring 167 of the keyboard; thence across the outer contacts F' and through wires 167ª, 167ᵇ, 167ᶜ, 167ᵈ, 167ᵉ, outer contact F at the sunflower, wiper 89, inner contact 2, wire 2ª, terminals 168ª and 168ᵇ of switch 168, wire 168ᶜ, inner contacts F' at the keyboard to inner bus-ring 166 and thence by wire 166ª, resistance 166ᵇ and fuse 166ᶜ to main 100. The circuit of clutch 109 is therefore closed by relay 110 and the wiper is arrested on contacts F—2, thereby prolonging the the impulse then flowing over the line and causing the tickers to print. When another key is depressed a similar cycle of operations is carried out. To bring the tickers and transmitter into unison the operator simply keeps his hands off the keyboard, thereby keeping all circuits open and causing the wiper to rotate uninterruptedly, until he sees the type wheel of his own ticker brought to rest by its unison mechanism. He then depresses the "letters period" key (the upper period key in Fig. 13, corresponding to the letters period contacts on the sunflower); whereupon the wiper is arrested on the letters period contact the next time it comes to that contact, and the tickers all print a period, exactly as if he had depressed the key 141 on the punching mechanism.

At the center of the keyboard, Figs. 13 and 14, is a repeat key 168, by which the normally closed contacts 169, 170, can be separated. These contacts are in series with the normally closed repeat contacts 133, 137, previously described. Hence, to repeat a letter without causing the sunflower wiper to make a complete revolution, the operator simply holds down the key of the letter which he desires to repeat (thereby keeping the wiper stationary) and depresses the repeat key 168. This opens the line circuit, which de-energizes the press magnet 105 and therefore causes the tape (at the ticker) to be advanced one letter-space. He then releases the repeat key, thereby closing the line again, which re-energizes the press magnet and causes the same letter to be printed again. Evidently this operation will be repeated as long as he depresses and releases the repeat key.

It will be observed that the keys of the punching machine, Fig. 1, and the keys of the transmitter keyboard, Fig. 13, bears letters and numerals, and that there are two period keys. As previously stated, a period is used after every word or number in lieu of a blank space, and advantage is taken of this use to select either row of characters on the ticker type wheel. Suppose for example that "ERIE/PF/43/STEEL/127½" is to be printed. After ERIE is printed the "letters period" is transmitted, because the characters (PF, signifying preferred) next to be transmitted are letters and hence the same row of characters is used as was employed for printing ERIE. But when PF has been printed the next characters are numerals and hence the other row must be used. Accordingly after PF the "figures period" is transmitted. This latter, by means such as described in Hiltz Patent No. 1,085,124, hereinbefore mentioned, brings to the impression point the period which is in the figures row and, just before the imprint is made, causes the figures row to be selected, so that the figures period is printed after PF and the ticker is left in condition to print figures. Having printed "43" the operator must shift back to the letters row in order to print the word "STEEL", and he therefore, after "43", transmits the letters period. Again, after "STEEL" is printed he transmits the figures period so that the "127½" can be printed.

It is to be understood that the invention is not limited to the apparatus herein specifically illustrated and described but can be embodied in other forms without departure from its spirit. The invention has important advantages in printing telegraphy and is claimed in that art, but with the understanding that the protection afforded by the claims is not confined to the art named but extends to all other fields in which the invention may be employed, as for example in the remote control of electric signs and of other devices.

We claim—

1. In a printing telegraph system, in combination, a transmitter for sending current over a transmission circuit, a plurality of transmitter control circuits selectable in pairs to determine the current-sending operation thereof, automatic contact mechanism controlled by a member having successive pairs of perforations to open and close said control circuits in pairs, manually actuated contact mechanism to open and close said control circuits in pairs, and means enabling either contact mechanism to be used at will, independently of the other to cause sending of character selecting and printing impulses by said transmitter.

2. In a printing telegraph system, in combination, a plurality of control circuits connected in sets and arranged in groups for controlling the transmission of current over a line; set-contacts individual to the sets of circuits; group-contacts individual to the groups of circuits; a contact common to and associated with the set-contacts; a contact common to and associated with the group-contacts; means for passing a perforated control member between the common contacts and their associated set and group contacts to permit engagement of contacts through perforations in the control member to close predetermined control circuits; and manual means operable at will to select and close the control circuits independently of the control member.

3. In a printing telegraph system, the combination with transmitting mechanism adapted to send current impulses over a transmission line, of controlling means therefor, including a sunflower having outer contacts connected in sets and arranged in groups and inner contacts associated with the respective groups; a rotating wiper engaging the inner and outer contacts to bridge the same; a group of secondary contacts connected individually to the aforesaid groups of outer contacts; a contact common to said secondary contacts; a group of secondary contacts connected individually to the said inner contacts; a contact common to the second mentioned group of secondary contacts; means for passing a perforated control tape between the secondary contacts and the associated common contacts to control electrical connection therebetween according to the positions of the perforations in the tape; and manually actuated means, operable independently of the tape, for controlling electrical connection between said secondary contacts and the associated common contacts.

4. In a printing telegraph system, in combination, a plurality of transmission control circuits connected in parallel sets and arranged in groups; a group of contacts connected individually with said sets of circuits; a group of contacts associated individually with said groups of circuits; means for connecting the contacts of the second group one after another to the contacts of the first group one after another through said control circuits in succession; and means for selectively connecting to one side of a source of current any contact of the first group and to the other side of the source of current any contact of the second group, at will.

5. In a printing telegraph system, in combination, a plurality of transmission control circuits connected in parallel to form sets of circuits and arranged in groups, the number of circuits in the several groups being equal, and groups of contacts associated with said sets and groups of circuits for selectively and individually connecting said circuits with a source of current; the number of circuits thus capable of such individual connection being the product of the numbers of contacts in said groups of contacts, as factors.

6. In a printing telegraph system, in combination, a plurality of transmission control circuits, the number of said circuits being the product of two factors, said circuits being connected in parallel to form sets each equal in number to one of said factors and to form groups each equal in number to the other factor; a group of contacts equal in number to the first factor and connected individually to the several sets of circuits; and a group of contacts equal in number to the second factor and associated individually with the several groups of circuits, to permit individual selection of the control circuits by combination of a single contact in the first group of contacts with a single contact in the second.

7. In a printing telegraph system, in combination, twenty-eight transmission control circuits, connected in parallel to form seven sets of four circuits each and four groups of seven each; and eleven controlling contacts for said circuits, seven contacts being associated individually with the seven sets of circuits and the remaining four being associated individually with the four groups of circuits, whereby any desired circuit can be selected by combining appropriate contacts in pairs.

8. In a printing telegraph system, in combination, transmitting mechanism having a sunflower provided with inner and outer contacts and a rotating wiper bridging the inner and outer contacts, each inner contact being common to an equal number of a plurality of outer contacts; and means to close a transmission control circuit through a selected inner contact, the wiper, and a selected outer contact.

9. In a printing telegraph system, in combination, a transmitter having a rotating commutator for sending current impulses in succession over a line, a sunflower provided with inner contacts, outer contacts connected to form sets in groups common to the inner contacts individually, each set of outer contacts being equal in number to the number of outer contacts in the other groups, a wiper rotating in harmony with the commutator to bridge the inner and outer contacts, and electromagnetic means for arresting the commutator and wiper; and means under the control of a perforated tape to close a control circuit for said electromagnetic means, through a selected inner contact, the wiper, and a selected outer contact.

10. In a printing telegraph system, a transmitter, a transmission line and a distant receiver, means at said transmitter for controlling the transmission of receiver-controlling current over a line, said means including a plurality of control circuits having contacts engageable through perforations in an insulating tape to close said circuits singly; in combination with means for advancing the tape past the contacts, said tape-advancing means including electromagnetic mechanism under the control of the receiver-controlling current.

11. In a printing telegraph system, a transmission circuit to a distant receiver, and means for controlling the transmission of current thereover, said means including a plurality of control circuits having contacts engageable through perforations in an insulating tape to close said circuits singly; in combination with means for advancing the tape past the contacts, said tape-advancing means including an actuating electromagnet, an energizing circuit therefor, and a relay in the transmission circuit to the distant receiver to open and close said energizing circuit.

12. In a printing telegraph system, means for controlling the transmission of receiver-controlling current over a line, said means including a plurality of control circuits having contacts engageable through perforations in an insulating tape to close said circuits singly; means under the control of the receiver-controlling current to advance the tape; means for perforating the tape to cause selective closing of the control circuits; means for feeding the tape through the perforating means; and means permitting the operation of the tape-advancing means only when there is a predetermined length of perforated tape between the perforating means and the tape-advancing means.

13. In a printing telegraph system, in combination, a plurality of circuit-controlling contacts engageable single through perforations in an insulating tape; mechanism for advancing the tape, including an actuating electromagnet and an energizing circuit therefor; mechanism for perforating the tape to cause selective engagement of the contacts; mechanism operating in harmony with the perforating mechanism to feed the tape therethrough step by step, one step at each perforating operation; and means actuated by the perforated tape to open the said energizing circuit whenever the tape between the contacts and the perforating mechanism is less than a predetermined length.

14. In a printing telegraph system, in combination, mechanism for perforating an insulating control tape; a rotary member having teeth to perforate the tape and advance the same; a cramp roller operating with the rotary member and recessed to receive the teeth thereon; and mechanism for rotating the said member step by step, one step at each perforating operation.

15. In a printing telegraph system, mechanism for perforating an insulating control tape, comprising in combination, a plurality of reciprocating punches arranged side by side, hammers operable to actuate the punches in pairs, and step by step means operating automatically after each punch-actuating operation to advance the tape one step past the punches.

16. In a printing telegraph system, in combination, a plurality of current-transmission control circuits, means under the control of said circuits for sending current impulses over a transmission line to control a distant receiver, contact mechanism under the control of a perforated insulating tape to close and open said control circuits, mechanism for perforating the tape according to a prearranged position-code, and mechanism for causing repeat operation of the distant receiver without impulses being sent over the transmission line, whenever the same code-perforations are made in succession in the tape.

17. In a printing telegraph system, in combination, a plurality of current-transmission control circuits, sunflower mechanism having a revolving wiper under the control of said circuits for sending current impulses over a transmission line to control a distant receiver, contact mechanism under the control of a perforated insulating tape to close and open said control circuits, means for causing feed of the tape through the contact mechanism, mechanism for causing repeat operation of the distant receiver without impulses being sent over the transmission line, whenever code-perforations are repeated in the tape, and for causing operation of the tape-feeding means while the wiper is stationary.

18. In a printing telegraph system, in combination, a plurality of current-transmission control circuits, means under the control of said circuits for sending current impulses over a transmission line to control a distant receiver, contact mechanism under the control of a perforated insulating tape fed through the same to close and open said control circuits, and repeat mechanism for causing feed of the tape through the contact mechanism independently of the sunflower mechanism.

19. In a printing telegraph system, in combination, means for sending current impulses over a transmission line to control a distant receiver according to the number of such impulses, contact mechanism under the control of a perforated insulating tape to control said sending means, mechanism for perforating the tape according to a pre-arranged position-code, mechanism for causing repeat operation of the distant receiver without impulses being sent over the transmission line, whenever code-perforations are repeated in the tape, and means operable at will for bringing the sending means and the receiver into unison with each other.

20. In a printing telegraph system, in combination, means for sending current impulses over a transmission line to control a distant receiver according to the number of such impulses so sent, contact mechanism under the control of a perforated insulating tape to control said sending means, mechanism for perforating the tape according to a pre-arranged position code, and means operable at will for bringing the sending means and the receiver into unison with each other.

21. In a printing telegraph system, in combination, means for sending current impulses over a transmission line to control a distant receiver according to the number of such impulses so sent, contact mechanism under the control of a perforated insulating tape to control said sending means, mechanism for perforating the tape according to a pre-arranged position code, and means operable under the control of perforations indiscriminately disposed upon the tape for bringing the sending means and the receiver into unison with each other.

22. In a printing telegraph system, in combination, means for sending current impulses over a transmission line to position a printing element in a distant receiver according to the number of such impulses so sent, contact mechanism under the control of a perforated insulating tape to control said sending means, mechanism for perforating the tape according to a pre-arranged position code, and means operable at will for causing the sending means to send impulses adequate in number to bring the printing element of the receiver to a position of unison with the sending means.

23. In a printing telegraph system, in combination, means for sending current impulses over a transmission line to control a distant receiver according to the number of such impulses so sent, a plurality of control circuits for said means, contact mechanism under the control of a perforated insulating tape to close and open said control circuits, means for opening one of said control circuits independently of said contact mechanism, and automatic unison mechanism for closing said independently opened circuit after a number of current impulses adequate to bring the receiver to unison with the sending means have been sent over the transmission line.

24. In a printing telegraph system, in combination, a plurality of transmission control circuits, a circular series of contacts in said circuits, a rotary contact member traversing said contacts, electromagnetic means energizable to arrest the contact member on a selected contact of said series, contact mechanism under the control of a perforated insulating tape to energize the electromagnetic means and thereby cause the latter to arrest the rotary contact member of a selected contact of said series when a circuit is closed through the said selected contact by the contact mechanism, means for opening one of the control circuits independently of the rotary contact member and said contact mechanism, and automatic means for closing such independently opened circuit when a predetermined minimum number of said contacts have been traversed by the rotary contact member.

25. In a printing telegraph system, in combination, a plurality of transmission control circuits, a circular series of contacts in said circuits, a rotary contact member traversing said contacts to close and open said circuits, means for opening one of the control circuits independently of the rotary contact member, and automatic unison mechanism for closing such independently opened circuit when a predetermined minimum number of said contacts have been traversed by the rotary contact member.

26. A printing telegraph system including a tape controlled transmitter, a transmission circuit and a distant receiver, and means for effecting feed of the tape at the transmitter, said means including devices brought into operation by and upon the printing at the distant receiver.

27. In a printing telegraph system with a printing receiver, a constantly running motor including an electromagnetic clutch for sending and stopping the sending of impulses over a line to said receiver, in combination with means automatically brought into operation by said motor for automatically entirely opening the line circuit upon a prolonged energization of said clutch by successive repetition of the same character whereby repeat printing of the character may be effected by the receiver.

28. In a printing telegraph system including in combination a single transmission circuit connecting a transmitter and a distant printing receiver, and means at the transmitter for holding the same in a given character selected position and for holding the receiver in character selected position for repeated printing of the same character, said means including a repeat mechanism which is automatically brought into operation by the transmitter itself, said transmitter including automatic sending means, and said repeat mechanism including devices which are automatically called into operation upon the automatic entering of the same character twice or more in succession by said automatic sending means in the transmitter.

29. In a printing telegraph system, a transmitter for controlling a ticker, said ticker having a press magnet and repeat mechanism at the transmitter for first completely breaking the press magnet circuit, and then reclosing the same to effect repeat printing of a character.

30. In a printing telegraph system including a ticker and a transmission circuit extending thereto, and a transmitter of the sunflower type, in combination with a plurality of means at said transmitter for effecting repeat printing operations by the said ticker, one means including devices automatically brought into operation by the automatic operation of the transmitter for repeated sending of the same character, and the other means including devices manually brought into operation upon manual sending of repeat characters.

31. In a printing telegraph system in combination with a transmitter receiver of the printing type, and a control circuit therefor extending thereto from the transmitter, means for effecting complete opening of said control circuit while current is flowing thereover to the receiver, said means including contacts adapted upon opening to open the control circuit and further being adapted upon reclosure to reenergize said circuit and impart thereto a sustained current flow for effecting repeat printing of a given character previously selected and printed at the receiver.

32. In a printing telegraph system, the combination with a transmitter comprising an automatic sending device, a sunflower and a clutch magnet, of means for repeating in a printing receiver any given character, said means including devices automatically brought into operation upon the presenting of the same character in multiple succession by the automatic sending device.

33. The invention set forth in claim 32, in which a supplemental complete manual keyboard is provided at said transmitter and which repeat key mechanism is provided which when operated in conjunction with a character key effects repeat printing at the receiver by and upon the depression and release of the repeat key.

34. In a printing telegraph system with a printing receiver and a transmitter, and a transmission circuit connecting the same, of means at said transmitter for repeating the printing of a given character already selected for printing and previously printed by the receiver, said means comprising a plurality of pairs of contacts in the transmission circuit to the receiver, means for opening and closing one of the aforesaid pairs by a manual operation, and means for opening and closing the other of said pairs by an automatic operation of the transmitter.

35. A repeat printing control for a printing telegraph receiver comprising a control circuit over which character selecting and sustained printing impulses are transmitted to the receiver, and means for opening and reclosing said control circuit to temporarily wholly interrupt a sustained printing impulse current flow and for thereafter re-establishing the flow of current of printing impulse current whereby repetition printing is effected by said receiver.

36. The invention set forth in claim 35 in which the opening and reclosing means comprise pairs of contacts which are serially connected and which are alternatively operable.

37. A repeat mechanism for effecting repeated printing by a printing telegraph receiver of a given character upon a single selection thereof comprising in combination with automatic transmitting devices of automatic repeat mechanism which is automatically called in action upon the sending of the same character a number of times by the automatic transmitter, said repeat mechanism being adapted to control the receiver to effect the repeated printing operation thereof.

38. In a printing telegraph system having a clutch magnet for controlling the sending of impulses to a receiver in combination with a repeat magnet connected to circuit with said clutch magnet and operatively energized upon the successive reception of a number of impulses in close succession by the clutch magnet.

39. In a printing telegraph system having a clutch magnet and a sunflower having controlling contacts for controlling the clutch magnet, a repeat magnet in circuit with the clutch magnet, said repeat magnet being proportioned to be operatively energized upon the successive sending of current impulses in quick succession from the same sunflower contacts, said repeat magnet being further proportioned to be ineffective for operation upon the receipt of irregularly timed impulses by the clutch magnet from various of the sunflower contacts.

40. In a printing telegraph system in combination with a transmitter including a sunflower with a plurality of contacts, of a printing telegraph receiver controlled thereby and having a press magnet, means for automatically effecting multiple printing operations of said press magnet by and upon the automatic transmission of successive impulses in quick succession from the same contacts of the sunflower.

41. In a printing telegraph system including in combination with a perforated tape transmitter, a receiver controlled thereby, means for feeding the transmitting tape, and means operative upon the successive sending of the same character in succession by said tape transmitter, and the maintenance of current flow to the receiver for reinitiating the tape feed of the transmitter automatically after repeat character printing by said receiver.

42. In a printing telegraph system having a perforated record automatic transmitting device, a printing receiver controlled thereby, feeding means for the transmitter tape, and means automatically called into action upon the successive presenting of like perforations in succession in said tape in the transmitter for maintaining the character selection in the receiver and effecting repeat printing therein, said means including other means for thereafter reinitiating a tape feed by the transmitter after a repeat character has been printed by the receiver.

43. In a printing telegraph system including in combination, a tape perforating device, a contact mechanism with provisions for establishing contacts through the said tape to control a distant receiver, means under the control of the distant receiver for effecting the feed of the tape through the contact mechanism, and means for further controlling the feed of the tape through the contact mechanism under the control of the perforating means.

44. In a printing telegraph apparatus including a sending apparatus, a transmission circuit and a distant receiver, said sending apparatus comprising a tape perforating means, a contact mechanism including mercury contacts controlled by the perforated tape for controlling circuits for selecting impulses to be sent over the circuit to the distant receiver, and a cooperating multiple means for controlling the feed of the tape through the contact mechanism, said means comprising devices under the control of the perforating means, and other devices brought into operation upon the completion of the action of the distant receiver.

45. In a printing telegraph system, a perforated tape contact mechanism including means for feeding the tape step by step therethrough, said means comprising a feed magnet, means for energizing said magnet upon the effecting of printing at a distant receiver, and means for breaking the magnet circuit under the control of the advancing tape.

46. In a printing telegraph system in combination, a contact mechanism receiving a perforated tape from an associated perforating apparatus, a distant receiver controlled by said contact mechanism, means for feeding a tape step by step through said contact mechanism, means for controlling and limiting the speed of the feed of the tape by controlling the tape feed conjointly by the receiver and by the output of tape from the perforator whereby the contact mechanism operates as rapidly as the receiver action and tape supply permit.

47. In a printing telegraph system including a receiver, a transmission circuit and a transmitter, means for bringing the receiver into unison with the transmitter, said means including manual means operable at will for securing unison and supplemental automatic means adapted to be preset by the operator for effecting a plurality of unison operations at pre-selected and optionally variably long and short periods.

48. In a printing telegraph system, in combination a transmitting apparatus comprising a perforated record controlled apparatus including a plurality of groups of contact elements, each group comprising a plurality of contact elements and each group having associated therewith its own common conductor with which the elements selectively establish contact through the perforated record, a sunflower mechanism having a bridging wiper and a plurality of individual contacts and common contacts traversed by said wiper, said individual contacts being connected to form sets or groups common to the common contacts individually, and means individually connecting said common contacts to the various contact elements of one of the aforesaid groups, and means connecting the individual contacts of the sets of the sunflower to the contact element of the other of the aforesaid groups.

In testimony whereof we hereto affix our signatures.

GEORGE S. HILTZ.
WILLIAM F. PURCELL.